United States Patent [19]

Harper

[11] 4,076,669

[45] Feb. 28, 1978

[54] AMORPHOUS POLYPROPYLENE IN HYDROGENATED RUBBERY BLOCK COPOLYMERS

[75] Inventor: Bobby R. Harper, Bartlesville, Okla.

[73] Assignee: Phillips Petroleum Company, Bartlesville, Okla.

[21] Appl. No.: 720,318

[22] Filed: Sep. 3, 1976

[51] Int. Cl.$^2$ ................................................ C08L 9/00
[52] U.S. Cl. ........................ 260/23.7 R; 260/23.7 M; 260/33.6 AQ; 260/876 B; 260/888; 260/889
[58] Field of Search .............. 260/23.7 R, 876 B, 888, 260/889, 23.7 M, 33.6 AQ

[56] References Cited

U.S. PATENT DOCUMENTS

| | | | |
|---|---|---|---|
| 3,257,372 | 6/1966 | Moon | 528/501 |
| 3,280,090 | 10/1966 | Scoggin | 528/501 |
| 3,281,383 | 10/1966 | Zelinski et al. | 260/23.7 R |
| 3,485,787 | 12/1969 | Haefle et al. | 260/33.6 AQ |
| 3,576,913 | 4/1971 | Johnson et al. | 260/876 B |
| 3,634,546 | 1/1972 | Hagemeyer, Jr. et al. | 260/876 B |
| 3,634,549 | 1/1972 | Shaw et al. | 260/876 B |
| 3,661,884 | 5/1972 | Shell et al. | 528/490 |
| 3,689,595 | 9/1972 | Gwinn | 260/876 B |
| 3,696,088 | 10/1972 | DeVault | 528/490 |
| 3,896,068 | 7/1975 | Walker | 260/876 B |

*Primary Examiner*—Eugene C. Rzucidlo

[57] ABSTRACT

Amorphous polypropylene is blended with a hydrogenated thermoplastic elastomer to give a composition having both high tensile strength and high melt flow.

10 Claims, No Drawings

AMORPHOUS POLYPROPYLENE IN HYDROGENATED RUBBERY BLOCK COPOLYMERS

BACKGROUND OF THE INVENTION

This invention relates to extended rubber compositions.

Oil extended rubbers are an important product of the rubber industry. Aromatic or naphthenic oils are generally used and as much as 60 parts by weight of oil per 100 parts by weight of rubber may be incorporated in these extended rubbers. Principally these extender oils serve as process aids and as a means to reduce the cost per unit of manufactured product.

However, some rubbers do not accept oil very well and suffer property degradation which makes them less desirable in certain applications. Also in many instances it is necessary to balance the competing properties so that a polymer, produced under conditions designed to give it sufficient strength, may be difficult to fabricate due to low melt flow.

Recently there had been developed a new class of rubbers known as plastomers or thermoplastic elastomers. These materials are thermoplastic in the same sense as resinous thermoplastic materials in that they can be remelted and molded; however, they have rubbery properties without the use of a curing agent. Basically, these rubbers comprise an internal rubbery polymer block with terminal blocks of essentially polymerized monovinyl-substituted aromatic compound. The rubbery block can be a diene homopolymer or a predominantly diene copolymer, either random or block.

SUMMARY OF THE INVENTION

It is an object of this invention to provide extended rubber with good tensile and melt flow properties; and it is a further object of this invention to provide thermoplastic elastomer compositions with good tensile and melt flow properties.

In accordance with this invention amorphous polypropylene is blended with a hydrogenated plastomer.

DESCRIPTION OF THE PREFERRED EMBODIMENTS

The amorphous polypropylene used in this invention is a solid, low molecular weight polymer of propylene (weight average molecular weight of 1,000–35,000, preferably 3,500–8,000), soluble in lower hydrocarbons such as pentane or xylene, and usually having less than 5% by weight crystalline component. For the purposes of this invention, amorphous polypropylene made by any of the known processes may be used. Preferably, it is the propylene soluble constituent of the total polymer prepared from propylene monomer using a catalyst comprising a titanium halide and alkyl aluminum as disclosed in Scoggin, U.S. Pat. No. 3,280,090 and Moon, U.S. Pat. No. 3,257,372, the disclosures of which are hereby incorporated by reference. It can be made also using a metal oxide type catalyst such as chromic oxide on alumina.

The hydrogenated rubber thermoplastic elastomers which can be used are preferably radial block copolymers of at least one monovinyl-substituted aromatic compound having 8–18 carbon atoms per molecule and at least one conjugated diene having 4–12 carbon atoms per molecule made by the process disclosed in U.S. Pat. No. 3,281,383 (Zelinski et al), the disclosure of which is hereby incorporated by reference. In this process the monovinyl-substituted aromatic component and conjugated diene are sequentially polymerized and thereafter coupled with a polyfunctional coupling agent.

Thermoplastic elastomers of an ABA configuration wherein the terminal A entities are polymeric monovinyl-substituted aromatic blocks and the B is a polymeric conjugated diene block are also suitable. These polymers are commercially available from Shell Oil Company under the trademark Kraton.

These polymers are then hydrogenated to a residual olefinic unsaturation of less than 5%, preferably less than 1% by means of a process such as that described in U.S. Pat. No. 3,696,088 or by other processes generally used in hydrogenating rubbers.

The resulting rubbers are plastomers, i.e., they are thermoplastic as well as rubbery and need no vulcanization. Thus, they can be injection molded or extruded to produce shoe soles, heels, garden hose, etc.

By the term rubber is meant a material having elastic as opposed to resinous characteristics as a result of the monovinyl-substituted aromatic content being in the range of only 15 to 40 weight percent, preferably 25 to 35 weight percent, and a diene content of 60 to 85, preferably 75 to 65, weight percent. The block monovinyl-substituted aromatic content will be within the range of 14 to 38 percent, preferably 23 to 33 weight percent.

The amorphous polypropylene can be used in an amount within the range of 6 to 60, preferably 15 to 30, parts by weight per 100 parts by weight of rubber. Generally, other ingredients such as fillers, antioxidants, pigments and the like are also present.

EXAMPLE I

The hydrogenated butadiene-styrene radial block copolymer was made by solution polymerization:

800 parts by weight cyclohexane, 3.5 parts by weight of tetrahydrofuran were charged to a reactor. 30 parts by weight of styrene were charged, after which 0.20 parts by weight n-butyllithium was introduced and the polymerization began. After the styrene had polymerized, 70 parts by weight of butadiene was charged and allowed to polymerize. After polymerization was completed, 0.5 part by weight epoxidized soybean oil (Paraplex) was added as a coupling agent. Paraplex is a trademark of Rohm and Haas. The polymer solution was recovered and transferred to a hydrogenation reactor and hydrogenated over a nickel/triethylaluminum catalyst using three 2-inch diameter columns in series with 18 inches of packing for a total residence time of 46 minutes. The polymer solution was transferred to a hold tank for 4.3 hours under 1.3 psig $H_2$ pressure. Then Ionol antioxidant was added in an amount of 0.5 part/hundred parts rubber and the catalyst suspension filtered. Ionol is a trademark of Shell Chemical Company for the antioxidant 2,6-di-tert-butyl-p-cresol. The polymer solution was steam stripped of solvent and the crumb was tray dried.

| Polymer Analyses | | |
|---|---|---|
| | Original Rubber | Hydrogenated Rubber |
| Trans content, wt. % | 37.4 | 0.2 |
| Vinyl content, wt. % | 32.0 | — |
| Total Styrene, % | 30.0 | — |
| Polystyrene, % | 28.6 | — |
| H.I. | 1.39 | — |

| -continued | | |
|---|---|---|
| Polymer Analyses | | |
| | Original Rubber | Hydrogenated Rubber |
| Mw/Mn × 10⁻³ | 110/79 | 111/74 |
| I.V./Gel | 0.69/0 | 0.66/0 |
| Ash, % | — | 1.06 |
| Olefinic, Unsaturation | — | 2.1% |

The amorphous polypropylene was the hot methanol extraction product of a waste stream of impure amorphous polypropylene recovered from a propylene polymerization process employing a titanium halide/alkyl aluminum catalyst. The methanol extraction is described in U.S. Pat. No. 3,661,884, the disclosure of which is hereby incorporated by reference.

| | |
|---|---|
| Weight Average - Molecular Wt. | about 4,000 |
| Ring & Ball Softening Point | 187° F |
| Melt Viscosity at 200° F | 890 |
| Melt Viscosity at 275° F | 125 |
| Melt Viscosity at 375° F | 35 |

For comparison, an unhydrogenated butadiene-styrene block copolymer, B/S 70/30, 30% polystyrene was made as the unhydrogenated sample above but coupled with $SiCl_4$. It had a number average mol wt. of $252 \times 10^3$; weight average mol wt. of $338 \times 10^3$; an inherent viscosity of 1.49; with 42% cis, 47% trans, and 11% vinyl unsaturation in the butadiene block (Solprene® 411). Solprene® is a trademark of Phillips Petroleum Company.

Blends were prepared as indicated below using a standard recipe and a naphthenic extender oil, commonly used for these rubbers (Flexon 766). Flexon 766 is a trademark of Humble Oil & Refining. The blends and results are shown in the table below:

TABLE I

| Composition, parts by wt.[1] | A Control | B Control | C Invention | D Control | E Control |
|---|---|---|---|---|---|
| Hydrogenated rubber | 100 | 100 | 100 | | |
| Unhydrogenated rubber | | | | 100 | 100 |
| Naphthenic extender oil | | 20 | | 20 | |
| Amorphous polypropylene | | | 20 | | 20 |
| Properties of Blend | | | | | |
| Melt Flow g/in 10 minutes | 0.75 | 35 | 26 | 5 | 184 |
| 300% Modulus, psi | 660 | 490 | 500 | 300 | 370 |
| Tensile strength psi (Room Temp.) | 3780 | 1090 | 2050 | 2460 | 1230 |
| Elongation, % | 620 | 600 | 700 | 800 | 600 |
| Tensile, psi 120° F | — | 450 | 650 | 1790 | 470 |

[1]All blends contained 80 parts by weight clay (Purecal O) a trademark of Wyandotte Chemicals, 20 parts by weight Coumarone-Indene resin and 0.5 part by weight stearic acid per 100 parts rubber.

The data show that the hydrogenated rubber, when compounded with amorphous polypropylene has a much higher tensile strength both at room temperature and at 120° F than the same rubber formulated with the naphthenic extender oil. It is also noteworthy that the unhydrogenated polymer was affected differently, the tensile strength being much worse with amorphous polypropylene than with extender oil. This demonstrates that different types of rubber respond differently to these processing additives. As can be seen, only the invention Run C using amorphous polypropylene in hydrogenated polymer gave both high tensile and high melt flow. Control Runs B and D show that naphthenic oil gives low tensile in hydrogenated rubber and low melt flow in unhydrogenated rubber. Control E shows that the amorphous polypropylene is not effective in giving good tensile in unhydrogenated polymer.

EXAMPLE II

A second series of tests were run using the hydrogenated radial butadiene/styrene block copolymer of Example I and hydrogenated linear butadiene-styrene rubbers identified as Kraton 1650 and 1652 (Kraton is a trademark of Shell Oil Co.). Their properties are provided below. In addition, three unhydrogenated butadiene-styrene polymers were tested.

TABLE II

Rubber and Properties

| Rubber | B/S | Hydrogenated | Cis | Trans | Vinyl | Mw/Mn[1] |
|---|---|---|---|---|---|---|
| | | | Wt. % | | | |
| 1. Radial Block | 70/30 | yes | nil | nil | nil | 110/74 |
| 2. Linear Kraton 1650 | 72/28 | " | " | 0.5 | " | 76/66 |
| 3. Linear Kraton 1652 | 70/30 | " | " | 0.5 | " | 66/46 |
| 4. Radial Block (Solprene® 411) | 70/30 | no | 42 | 47 | 11 | 338/252 |
| 5. Radial Block (Solprene 414) | 60/40 | no | 44 | 45 | 10 | 160/120 |
| 6. Radial Block (Solprene 406) | 60/40 | no | 42 | 48 | 10 | 320/248 |

[1]Mw = weight average mol. wt. × 10⁻³
Mn = number average mol. wt. × 10⁻³

The above rubbers were blended in a midget Banbury using the recipe given below until a uniform blend was attained, i.e., 3–10 minutes.

| Recipe, parts by weight | |
|---|---|
| Rubber | 100 |
| CaCO₃ | 80 (Purecal O) |
| Coumarone-Indene Resin | 20 (Kristalex 1140*) |
| Stearic Acid | 0.5 |
| Naphthenic Extender Oil or Amorphous Polypropylene | 25 |

*a trademark of Pennsylvania Industrial Chemical Corporation.

Sample bars were molded from the blends and physical properties were tested. Results are tabulated below:

TABLE III

| Rubber | Naphthenic Oil Extended | | | | | Amorphous Polypropylene Extended | | | | |
|---|---|---|---|---|---|---|---|---|---|---|
| | g/10[1] min. Melt Flow | Room T. Tensile psi | Elongation % | Tensile psi at 120° F | 300% Modulus | g/10 min. Melt Flow | Room T. Tensile psi | Elongation % | 120° F Tensile psi | 300% Modulus |
| 1 | 45 | 1,225 | 590 | 450 | 500 | 35 | 1,800 | 630 | 775 | 450 |
| 2 | 6.4 | 1,700 | 680 | 560 | 450 | 2.4 | 2,000 | 660 | 1,115 | 450 |
| 3 | 32 | 1,275 | 580 | 485 | 650 | 16 | 2,325 | 600 | 875 | 600 |
| 4 | 3.8 | 2,400 | 820 | 1,920 | 350 | 357 | 460 | 550 | 340 | 290 |
| 5 | Too fast to measure | 1,375 | 690 | 500 | 440 | Too fast to measure | 1,260 | 560 | 720 | 600 |
| 6 | 11 | 2,450 | 760 | 1,785 | 510 | 349 | 975 | 570 | 560 | 525 |

[1]ASTM D-1238-74 (21.6 Kg at 190° C, g/10 min.)

The data show that both radical and linear hydrogenated block copolymers (Rubbers 1-3) have better physical properties, i.e., tensile strength at room temperature and at 120° F, elongation and 300% modulus when compounded with amorphous polypropylene than when compounded with a naphthenic extender oil. On the other hand, unhydrogenated rubbers are adversely affected by compounding with amorphous polypropylene.

Although this invention has been described in detail for the purposes of illustration, it is not to be construed as limited thereby but is intended to cover all the changes and modifications within the spirit and scope thereof.

I claim:

1. A composition comprising:
a hydrogenated plastomer of a monovinyl-substituted aromatic compound and a conjugated diene; and
amorphous polypropylene in an amount within the range of 6-60 parts by weight per 100 parts by weight of said plastomer.

2. A composition according to claim 1 wherein said plastomer is a copolymer of styrene and butadiene.

3. A composition according to claim 1 wherein said plastomer contains 23 to 33 weight percent block monovinyl-substituted aromatic compound.

4. A composition according to claim 2 wherein said amorphous polypropylene has a weight average molecular weight within the range of 3,500 to 8,000.

5. A composition according to claim 4 wherein said amorphous polypropylene soluble fraction from a propylene polymerization process.

6. A composition according to claim 2 wherein said composition contains in addition a filler.

7. A composition according to claim 2 wherein said plastomer is a radial block copolymer.

8. A composition according to claim 2 wherein said plastomer is produced by first charging a randomizing agent, styrene, and n-butyllithium and subjecting the resulting mixture to polymerization conditions, thereafter introducing butadiene, and thereafter introducing an epoxidized soybean oil coupling agent.

9. A composition according to claim 2 wherein said hydrogenation is carried out utilizing a nickel/triethylaluminum catalyst to give a residual olefinic unsaturation of less than 5 percent.

10. A composition according to claim 9 wherein said plastomer has a block polystyrene content of 23 to 33 weight percent, said amorphous polypropylene has a weight average molecular weight within the range of 3,500 to 8,000 and is the propylene soluble component of a propylene polymerization process and wherein said plastomer is produced by sequential polymerization of butadiene and styrene with subsequent coupling with a polyfunctional coupling agent.

* * * * *